United States Patent [19]

van de Brand

[11] Patent Number: 5,052,976
[45] Date of Patent: Oct. 1, 1991

[54] THRESHING DEVICE FOR PULSE CROPS
[75] Inventor: Anton M. van de Brand, Wernhout, Netherlands
[73] Assignee: Mali-Ploeger B.V., Oud-Gastel, Netherlands
[21] Appl. No.: 545,489
[22] Filed: Jun. 29, 1990
[30] Foreign Application Priority Data Jun. 30, 1989 [NL] Netherlands .................. 8901658

[51] Int. Cl.$^5$ .............................................. A01F 12/18
[52] U.S. Cl. ........................................ 460/14; 460/76; 460/83
[58] Field of Search ..................... 460/14, 63, 66, 76, 460/83, 131, 141

[56] References Cited

U.S. PATENT DOCUMENTS

| 549,808 | 11/1895 | Mercer | 460/76 |
| 2,543,537 | 2/1951 | Smith | 460/141 |
| 2,974,467 | 3/1961 | Long | 460/141 |

Primary Examiner—Terry L. Melius
Attorney, Agent, or Firm—Oblon, Spivak, McClelland, Maier & Neustadt

[57] ABSTRACT

The invention relates to a threshing device for pulse crops, said threshing device being provided with a drum rotatable about its at least substantially horizontally arranged axis of rotation, the surface of said drum being provided with openings. In the interior of the drum there is arranged a main threshing means, which is rotatable about its axis of rotation extending at least substantially parallel to the axis of rotation of the drum, in such a manner that during operation parts of the main threshing means located near the drum surface of the drum move in the same direction as the adjacent part of the drum surface. The main threshing means is furthermore provided with projecting parts which, besides imparting a component of movement of the crop directed towards the interior surface of the drum, also impart a component of movement to the crop in the longitudinal direction of the drum. The main threshing means is arranged above the main threshing means, near a part of the drum surface that moves upwards during operation, while a second auxiliary threshing means is provided, at a level intermediate the longitudinal axis of the first auxiliary threshing means and the longitudinal axis of the main threshing means, whereby the second auxiliary threshing means is arranged near a part of the drum surface that moves downwards during operation.

3 Claims, 2 Drawing Sheets

THRESHING DEVICE FOR PULSE CROPS

BACKGROUND OF THE INVENTION

1. Field of the Invention

The invention relates to a threshing device for pulse crops, said threshing device being provided with a drum rotatable about its at least substantially horizontally arranged axis of rotation, the surface of said drum being provided with openings, whereby in the interior of the drum there is arranged a main threshing means, which is rotatable about its axis of rotation extending at least substantially parallel to the axis of rotation of the drum, in such a manner that during operation parts of the main threshing means located near the drum surface of the drum move in the same direction as the adjacent part of the drum surface, and whereby the main threshing means is provided with projecting parts, which are shaped such that besides imparting a component of movement to the crop directed towards the interior surface of the drum they also impart a component of movement to the crop in the longitudinal direction of the drum, whilst inside the drum there is arranged an auxiliary threshing means which is rotatable about its longitudinal axis extending at least substantially parallel to the axis of rotation of the drum.

2. Description of the Related Art

With a known device of this kind the main threshing means is arranged with its longitudinal axis above the axis of rotation of the drum, whilst the auxiliary threshing means is placed beside the main threshing means. The main threshing means throws the material rubbed against the interior drum surface by the main threshing means in the direction of the space located above the auxiliary threshing means, said material to be thrown downwards by means of said auxiliary threshing means, in co-operation with the side of the main threshing means directed towards the auxiliary threshing means.

SUMMARY OF THE INVENTION

Accordingly, one object of this invention is to provide threshing device of the above kind, by means of which a more effective threshing of the pulse crops can be obtained.

According to the invention this can be achieved in that the main threshing means is arranged near the lower side of the drum, near a part of the drum surface that moves upwards during operation, whilst the auxiliary threshing means is arranged above the main threshing means, near a part of the drum surface that moves upwards during operation, whilst inside the drum there is provided a second auxiliary threshing means, which is rotatable about is longitudinal axis extending at least substantially parallel to the axis of rotation of the drum, said longitudinal axis being located at a level intermediate the longitudinal axis of the first auxiliary threshing means and the longitudinal axis of the main threshing means, whilst the second auxiliary threshing means is arranged near a part of the drum surface that moves downwards during operation.

In use the crop introduced into the drum will be rubbed against the inner surface of the drum by means of the main threshing means and be moved, by co-operation of the main threshing means with the inner drum surface, in the direction of the auxiliary threshing means arranged above the main threshing means, by means of which auxiliary threshing means the crop is subjected to further rubbing, said crop being moved between said auxiliary threshing means and the inner wall surface. The crop having passed said first auxiliary threshing means is thrown in the direction of the second auxiliary threshing means, by means of which the material is thrown partly on the main threshing means and partly on the lower part of the inner surface of the drum.

When using the construction according to the invention the material is subjected to a strong rubbing action, whilst in addition to that a large sieving surface for the material is available, as a result of which an effective removal of the pulse crops from the shells, as well as a quick and effective sieving of the material can be effected with minimal damage to the product.

BRIEF DESCRIPTION OF THE DRAWINGS

The invention will be further explained hereinafter with reference to an embodiment of the construction according to the invention diagrammatically illustrated in the accompanying figures.

DESCRIPTION OF THE PREFERRED EMBODIMENTS

The threshing device comprises a threshing device 1, which is accommodated in a frame (not shown). Said drum 1 is supported by wheels 2, at least one of which being rotatable, by way of a driving means (not shown), in the direction according to arrow A, as a result of which the drum will rotate in the direction according to arrow B.

The drum surface is formed by sieves in a manner which is known per se.

The drum 1 is thereby arranged in the threshing device in such a manner that the axis of rotation or the longitudinal axis of the drum is arranged at least substantially horizontally. Pulse crops to be threshed can be supplied to the interior of the drum near one end of the drum, by way of means not shown, whilst the emptied shells, any leaf and the like can be discharged, by way of means not shown either, near the other end of the drum.

Figure 1:
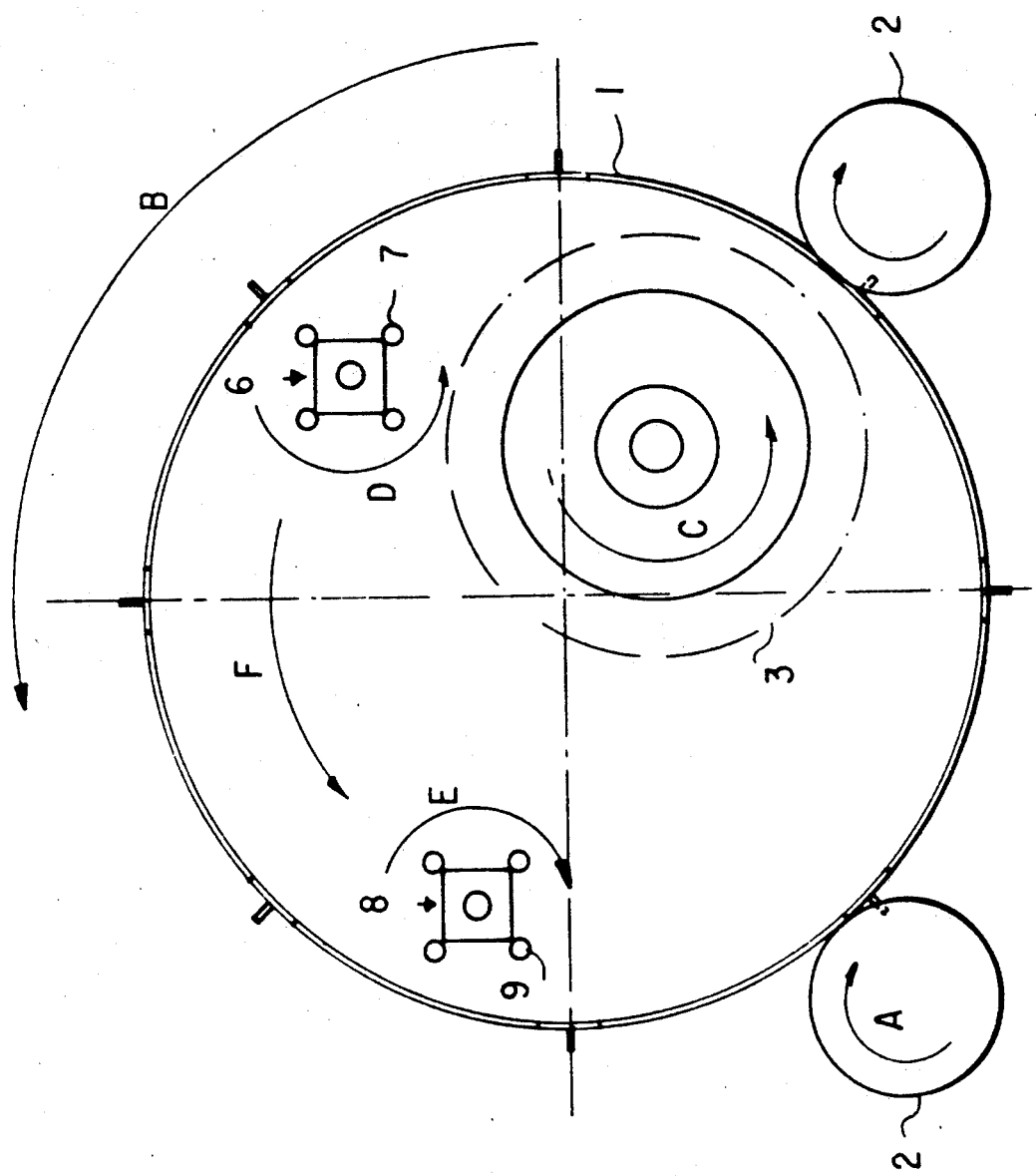
FIG. 1 is a diagrammatic cross-section of a threshing drum with threshing means arranged therein.

In the drum 1 there is arranged a main threshing shaft 3 diagrammatically illustrated in FIG. 1.

Figure 2:
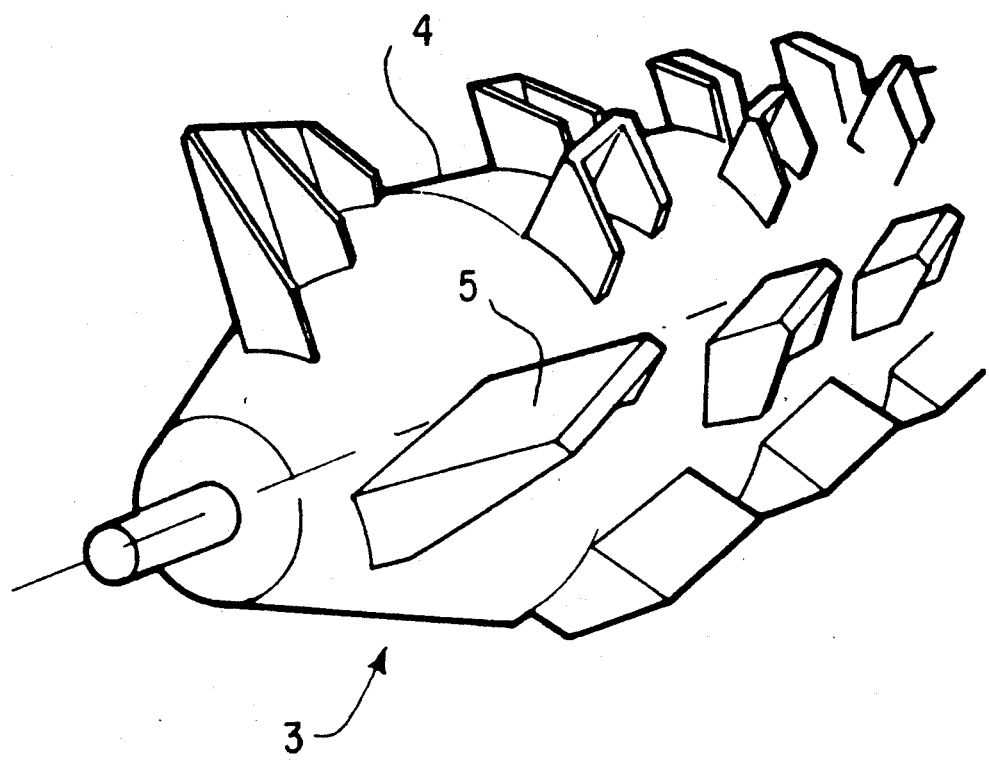
FIG. 2 is a diagrammatic, perspective view of a part of a main threshing means.

As is illustrated in more detail in FIG. 2 said main threshing means comprises an elongated, substantially cylindrical body 4, on the outer surface of which there are provided outwardly extending blades 5. As will be apparent from FIG. 2 surfaces of the blades 5 which get into touch with the crop during operation enclose an angle with a plane extending through the longitudinal axis of the main threshing means. As a result it is effected that when the main threshing means is rotated in the direction of arrow C during operation, by way of a driving means (not shown), the crop is not only directed by means of the projecting parts 5, towards sieves forming the inner surface of the drum 1, but at the same time a component of movement is imparted in the longitudinal direction of the drum 1, so that the crop will gradually be moved from the one end of the drum 1 towards the other end of the drum 1.

As is apparent from FIG. 1 the main threshing shaft 3 is thereby arranged in such a manner that parts of the main threshing shaft located near the inner surface of the drum 1 are located near a lower part of the drum surface and move upwards with said part of the drum surface in the same direction thereby.

In the interior of the drum 1 there is furthermore arranged a first auxiliary threshing means 6 above the main threshing means, which auxiliary threshing means 6 can be driven in the direction according to arrow D during operation, by way of a driving means (not shown), in such a manner that the auxiliary threshing means 6 thereby rotates about a longitudinal axis extending parallel to the axis of rotation of the drum 1. The auxiliary threshing means 6 is thereby provided with four rods 7 extending parallel to its longitudinal axis, by means of which rods the crop is moved along and rubbed against the inner wall of the drum 1 during operation.

In the interior of the drum there is furthermore arranged a second auxiliary threshing means 8, which is rotatable in a direction according to arrow E about its longitudinal axis extending parallel to the axis of rotation of the drum 1. The design of said second auxiliary threshing means 8 is similar to that of the first auxiliary threshing means 6; also the auxiliary threshing means 8 is therefore provided with a plurality of rods 9 extending parallel to its longitudinal axis.

As will be apparent from FIG. 1 the longitudinal axis of the second auxiliary threshing means 8 is located between the longitudinal axes of the main threshing means 3 and the auxiliary threshing means 6, and higher than the axis of rotation of the drum 1, when seen in vertical direction. The auxiliary threshing means 8 is furthermore located near that part of the wall surface that moves downwards during operation.

Pulse crops introduced into the inlet side of the drum 1 during operation are carried along by the lower part of the rotating wall surface of the drum 1 in the direction according to arrow B, and get into touch with the projecting parts 5 of the main threshing means 3 thereby. By means of said main threshing means the pulse crops will be moved between the main threshing means 3 and the inner surface of the wall 1 and be rubbed along said inner surface thereby for the shells to he opened and the products thus to be separated from the shells. The crop moved between the main threshing means 3 and the inner surface of the drum wall will be thrown in the direction of the auxiliary threshing means 6, after which the crop will be moved between said auxiliary threshing means 6 and the inner surface of the drum wall. Also here the crop will be subjected to a rubbing action so as to support and add to the threshing action of the main threshing means 3. When the crop is thus being moved by means of the main threshing means 3 and the auxiliary threshing means 6, along the right-hand wall part of the threshing drum 1, seen in FIG. 1, part of the products can already be pushed outwards through the sieves forming the wall surface.

The crop having passed the auxiliary threshing means 6 will be thrown away by the auxiliary threshing means in the direction according to arrow F. At least part of the threshed products will thereby strike against the inner surface of the drum wall 1 and at least partially move outwards through the sieve. Part of the crop can fall down between the auxiliary threshing means 8 and the main threshing means 3, to land on the lower part of the wall surface of the drum 1 again. A further part of the crop will land on the auxiliary threshing means 8 and be thrown, by means of said auxiliary threshing means 8, in the direction of the main threshing means 3 and/or the lower part of the wall surface of the drum 1.

Also in this case at least part of the released products will move outwards through the sieve openings.

The remaining part of the crop landed on the lower part of the wall surface will be carried along again by the drum 1 in the direction of the main threshing shaft, after which the above cycle will be repeated again. It will be apparent that at the same time the crop is gradually moved in the longitudinal direction of the drum thereby, from the one end of the drum towards the other end.

By using the construction according to the invention the crop will be repeatedly rubbed against the inner surface of the drum wall formed by the sieves, as a result of which a good opening of the shells will be achieved, with minimal damage to the products.

Furthermore the crop will touch the sieve surface frequently and intensively, as a result of which a fast sieving will be achieved, which adds to the processing capacity and furthermore will make for as little damage to the products as possible.

For influencing the threshing operation, possibly in dependence on the nature of the crop, the device can be designed much that the first auxiliary threshing shaft 6 and/or the second auxiliary threshing shaft 8 can be driven in two directions.

I claim:

1. Threshing device for pulse crops, said threshing device being provided with a drum rotatable about an at least substantially horizontally arranged axis of rotation, the surface of said drum being provided with openings, whereby in the interior of the drum there is arranged a main threshing means, said main threshing means having projecting parts and being rotatable about an axis of rotation extending at least substantially parallel to the axis of rotation of the drum, in such a manner that during operation said projecting parts of the main threshing means pass near the drum surface of the drum and move in the same direction as the adjacent part of the drum surface, said projecting parts being shaped such that besides imparting a component of movement directing towards the interior surface of the drum they also impart a component of movement to the crop in the longitudinal direction of the drum, whilst inside the drum there is arranged a first auxiliary threshing means which is rotatable about a longitudinal axis extending at least substantially parallel to the axis of rotation of the drum, characterized in that the main threshing means is arranged near the lower side of the drum, near a part of the drum surface that moves upwards during operation, whilst the first auxiliary threshing means is arranged above the main threshing means, near a part of the drum surface that moves upwards during operation, whilst inside the drum there is provided a second auxiliary threshing means, which is rotatable about a longitudinal axis extending at least substantially parallel to the axis of rotation of the drum, said longitudinal axis being located at a level intermediate the longitudinal axis of the first auxiliary threshing means and the longitudinal axis of the main threshing means, whilst the second auxiliary threshing means is arranged near a part of the drum surface that moves downwards during operation.

2. Threshing device according to claim 1, characterized in that the axis of rotation of the second auxiliary threshing means is located higher than the axis of rotation of the drum.

3. Threshing device according to claim 1 or 2, characterized in that at least one of said first and second auxiliary means can be driven in two opposite directions.

* * * * *

UNITED STATES PATENT AND TRADEMARK OFFICE
CERTIFICATE OF CORRECTION

PATENT NO. : 5,052,976
DATED : October 1, 1991
INVENTOR(S) : Antonius M. Van de Brand It is certified that error appears in the above-identified patent and that said Letters Patent is hereby corrected as shown below:

In the Abstract, right-hand column, line 17, delete "above the main threshing means" and insert therefor --near the lower side of the drum--.

Column 3, line 42, delete "he" and insert therefor --be--.

Column 4, line 23, delete "much" and insert therefor --such--.
line 39, delete "directing" and insert therefor --directed--.

Signed and Sealed this

Thirtieth Day of March, 1993

Attest:

STEPHEN G. KUNIN

*Attesting Officer*  *Acting Commissioner of Patents and Trademarks*